US009298190B2

(12) United States Patent
Oksanen et al.

(10) Patent No.: US 9,298,190 B2
(45) Date of Patent: Mar. 29, 2016

(54) AUTOMATIC FLOW CONTROL SYSTEM AND APPARATUS

(71) Applicant: SINGER VALVE, INC., Surrey (CA)

(72) Inventors: Kari Juhani Oksanen, Vancouver (CA); Marc Norman Ferrer Payot, New Westminster (CA)

(*) Notice: Subject to any disclaimer, the term of this patent is extended or adjusted under 35 U.S.C. 154(b) by 150 days.

(21) Appl. No.: 14/145,686

(22) Filed: Dec. 31, 2013

(65) Prior Publication Data
US 2015/0114492 A1 Apr. 30, 2015

Related U.S. Application Data

(63) Continuation-in-part of application No. 14/068,667, filed on Oct. 31, 2013.

(51) Int. Cl.
| | |
|---|---|
| *F16K 31/12* | (2006.01) |
| *F16K 31/36* | (2006.01) |
| *G05D 7/03* | (2006.01) |
| *F16K 17/10* | (2006.01) |
| *G05D 16/16* | (2006.01) |
| *F16K 31/124* | (2006.01) |
| *G05D 7/01* | (2006.01) |

(52) U.S. Cl.
CPC . *G05D 7/03* (2013.01); *F16K 17/10* (2013.01); *F16K 17/105* (2013.01); *F16K 31/1245* (2013.01); *G05D 7/014* (2013.01); *G05D 16/163* (2013.01); *Y10T 137/776* (2015.04); *Y10T 137/7758* (2015.04); *Y10T 137/7762* (2015.04); *Y10T 137/7764* (2015.04); *Y10T 137/7768* (2015.04)

(58) Field of Classification Search
CPC ....... G05D 7/03; G05D 7/014; G05D 16/163; F16K 31/1245; F16K 17/10; F16K 17/105; Y10T 137/7762; Y10T 137/7764; Y10T 137/7768
USPC .............. 137/485, 486, 487, 488, 489, 489.5; 251/25, 28, 29
See application file for complete search history.

(56) References Cited

U.S. PATENT DOCUMENTS

| | | | | |
|---|---|---|---|---|
| 3,977,423 | A | * | 8/1976 | Clayton .......................... 137/12 |
| 4,617,958 | A | * | 10/1986 | Seidel et al. ................ 137/492.5 |
| 5,348,036 | A | * | 9/1994 | Oksanen et al. ................... 137/1 |
| 5,967,176 | A | | 10/1999 | Blann et al. |
| 7,066,710 | B2 | * | 6/2006 | Wiggins et al. ................. 415/19 |

\* cited by examiner

*Primary Examiner* — John K Fristoe, Jr.
*Assistant Examiner* — Kelsey Rohman
(74) *Attorney, Agent, or Firm* — Gordon Intellectual Property Law, PLLC

(57) ABSTRACT

A pilot valve assembly for use with a main valve apparatus coupled to a water pipe, includes a differential pilot valve, and first and second pilot valves. An inlet of the differential pilot valve is coupled to a junction and an outlet is coupled to the first pilot valve. The differential pilot valve is responsive to a pressure differential to open and close the differential pilot valve to control water flow therethrough to the first pilot. The first pilot valve is responsive to a first pressure to close the first pilot valve to reduce water flow therethrough. The second pilot valve is coupled to the junction to facilitate water flow through the second pilot valve when the differential valve member is open. The second pilot valve is responsive to a second pressure to close the second pilot valve to reduce water flow therethrough.

16 Claims, 2 Drawing Sheets

AUTOMATIC FLOW CONTROL SYSTEM AND APPARATUS

TECHNICAL FIELD

The present invention relates to an automatic flow control system for use with an automatic pressure-reducing valve utilized to control downstream pressure in a water system.

BACKGROUND

Automatic pressure reducing valves are used in water distribution systems to reduce pressure to a pre-determined value or set-point that is adequate but does not expose normal components, such as household hot water tanks, to overpressure. The set-point is a pressure downstream from the valve and is determined according to the use of the valve. Water distribution systems experience significant losses of drinking water due to leaks, and as volume lost through leakage is directly related to pressure in the system, the set-point is determined to provide sufficient pressure that meets criteria of the water utility, particularly under high or "peak" demand conditions that may occur when fire is being fought. The pressure required for peak demand is typically significantly higher than that required for "off-peak" or typical night time conditions.

Valves are known for which the set-point may vary, and thus the downstream pressure from the valve may vary. Such valves are utilized to maintain the set-point, or downstream pressure, relatively low for off-peak or night time operation, thus reducing losses in the piping, and to raise the set-point during high flow demand for daily peak or special conditions such as may occur during fire fighting. Two types of automatic flow control valves with variable set-points include electronically controlled valves and "flow-driven" valves. The electronically controlled valves are relatively complex and require an electrical power source, such as batteries or access to utility power lines. The electrical power source increases installation costs and servicing costs and, as a result, such valves are used in limited numbers. Flow-driven valves use fluid pressures to control actuation of the main valve, and thus are independent of external power sources and can be used in most locations.

One type of such valve is supplied by Bermad, a corporation of Evron, Israel. This valve has a flow sensor responsive to differential pressures which are applied on opposite sides of an actuator diaphragm. A rigid push rod transfers diaphragm movement to a controlling valve member of a pilot valve which in turn determines control pressure which actuates the main valve. The actuator diaphragm is immersed in fluid which severely limits movement thereof, and this restriction limits movement of the push rod and valve member thus reducing valve sensitivity. When the flow sensor of such a valve is subjected to unusually high flow, however, the main valve can be opened excessively, resulting in excessively high downstream pressures that may cause damage to equipment and household appliances that are exposed to such pressure.

SUMMARY

According to an aspect of an embodiment, an automatic flow control system is provided. The system is utilized with a main valve apparatus that includes a body having an inlet for coupling to a first end of a water pipe and an outlet for coupling to a second end of a water pipe. A main valve member is disposed between the inlet and the outlet and is moveable between a closed position in which flow of water through the main valve apparatus is inhibited and an open position to facilitate flow of water through the main valve apparatus. A main valve operator comprising a diaphragm or piston cooperates with the main valve member and the main valve body to provide a control chamber. The main operator is responsive to control pressure in the control chamber to move the main valve member between the closed position and the open position. A restriction mechansim is disposed between the first end of the water pipe and the second end of the water pipe for creating a pressure differential. The automatic flow control system includes a junction including an inlet port for fluid communication with the inlet of the main valve apparatus by an inlet conduit, a control port for fluid communication with a control chamber of the main valve apparatus by a control conduit, and a pilot port. The system also includes a pilot valve assembly. The pilot valve assembly includes a differential pilot valve apparatus including a differential valve inlet coupled to the pilot port of the junction, a differential valve outlet, and a differential valve member disposed between the differential valve inlet and the differential valve outlet. The differential pilot valve apparatus is responsive to the pressure differential to move the differential valve member between an open position in which water flows from the differential valve inlet to the differential valve outlet, and a closed position in which water flow from the differential valve inlet to the differential valve outlet is inhibited. The pilot valve assembly also includes a first pilot valve apparatus including a first pilot valve inlet coupled to the differential valve outlet, a first pilot valve outlet, and a first pilot valve member disposed between the first pilot valve inlet and the first pilot valve outlet. The first pilot valve outlet is coupled to the second end of the water pipe to facilitate flow of water from the differential valve outlet, through the first pilot valve apparatus, to the second end of the water pipe when the differential valve member is in an open position. The first pilot valve apparatus is responsive to a first pressure to close the first pilot valve member to reduce flow of water therethrough. The system also includes a second pilot valve apparatus including a second pilot valve inlet coupled to the junction, a second pilot valve outlet, and a second pilot valve member. The second pilot valve outlet is coupled to the second end of the water pipe to facilitate flow of water from the junction, through the second pilot valve apparatus, to the second end of the water pipe when the second differential valve member is in an open position. The second pilot valve apparatus is responsive to a second pressure to close the second pilot valve member to reduce flow of water therethrough. The first pressure differs from the second pressure.

According to another embodiment, a pilot valve assembly is provided. The pilot valve assembly includes differential pilot valve apparatus including a differential valve inlet for coupling to a junction, a differential valve outlet, and a differential valve member disposed between the differential valve inlet and the differential valve outlet. The differential pilot valve apparatus is responsive to a pressure differential to move the differential valve member between an open position for the flow of fluid from the differential valve inlet to the differential valve outlet, and a closed position in which fluid flow from the differential valve inlet to the differential valve outlet is inhibited. A first pilot valve apparatus includes a first pilot valve inlet coupled to the differential valve outlet, a first pilot valve outlet, and a first pilot valve member disposed between the first pilot valve inlet and the first pilot valve outlet, to facilitate flow of fluid from the differential valve outlet, to the first pilot valve outlet when the differential valve member is in an open position. The first pilot valve apparatus is responsive to a first pressure to close the first pilot valve member to reduce flow of water therethrough. A second pilot valve apparatus includes a second pilot valve inlet for coupling to the junction, a second pilot valve outlet, and a second pilot valve member, to facilitate flow of water from the junction, through the second pilot valve apparatus when the second pilot valve member is in an open position. The second pilot valve apparatus is responsive to a second pressure to close the second pilot valve member to reduce flow of water therethrough.

BRIEF DESCRIPTION OF THE DRAWINGS

Embodiments of the present invention will be described, by way of example, with reference to the drawing and to the following description, in which.

DETAILED DESCRIPTION

Figure 1:
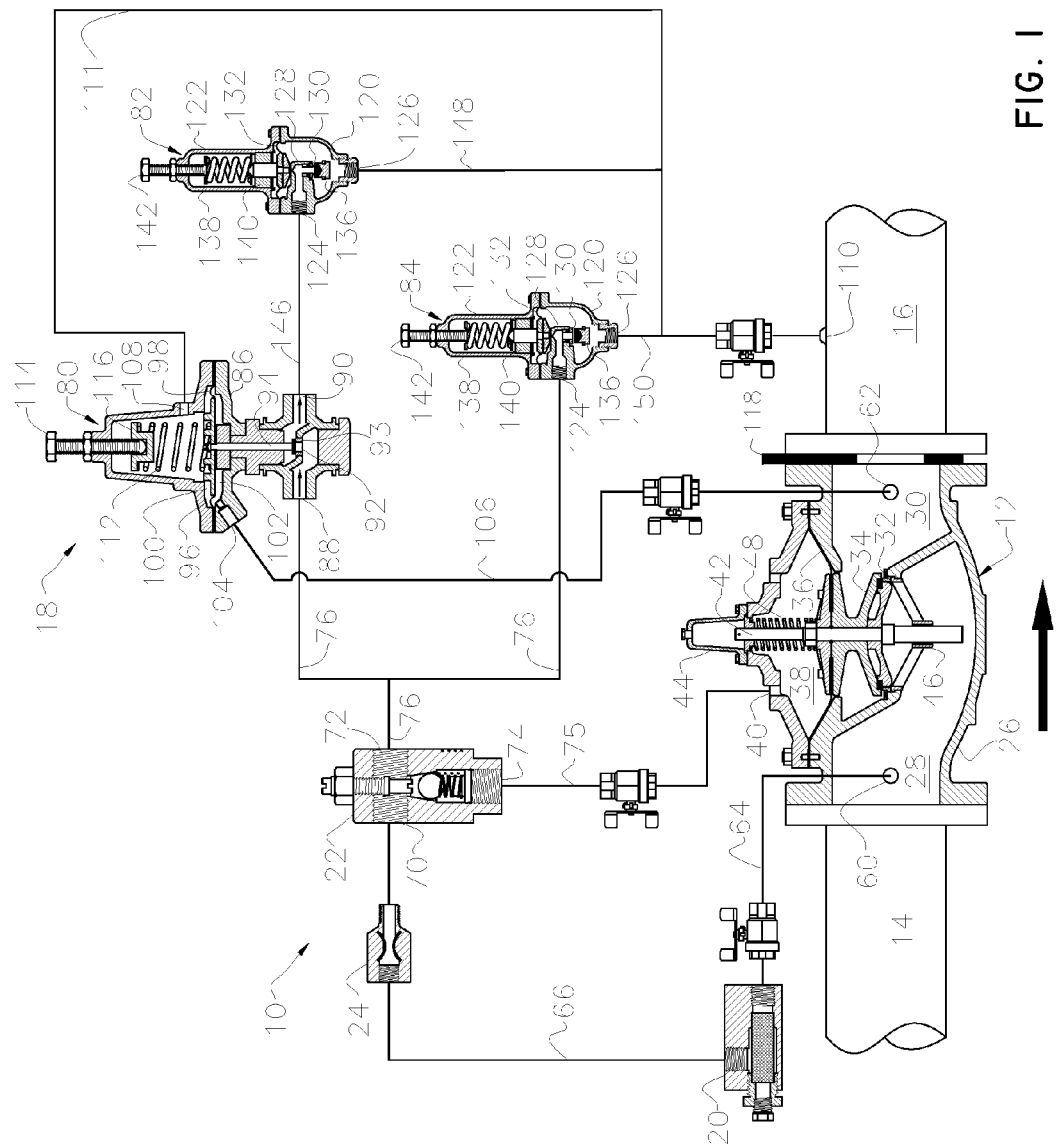
FIG. 1 is a simplified schematic of an automatic flow control system including a differential pilot valve assembly according to an embodiment of the invention.

For simplicity and clarity of illustration, numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to a pilot valve assembly that includes a differential pilot valve apparatus including a differential valve inlet for coupling to a junction, a differential valve outlet, and a differential valve member disposed between the differential valve inlet and the differential valve outlet. The differential pilot valve apparatus is responsive to a pressure differential to move the differential valve member between an open position for the flow of fluid from the differential valve inlet to the differential valve outlet, and a closed position in which fluid flow from the differential valve inlet to the differential valve outlet is inhibited. A first pilot valve apparatus includes a first pilot valve inlet coupled to the differential valve outlet, a first pilot valve outlet, and a first pilot valve member disposed between the first pilot valve inlet and the first pilot valve outlet, to facilitate flow of fluid from the differential valve outlet, to the first pilot valve outlet when the differential valve member is in an open position. The first pilot valve apparatus is responsive to a first pressure to close the first pilot valve member to reduce flow of water therethrough. A second pilot valve apparatus includes a second pilot valve inlet for coupling to the junction, a second pilot valve outlet, and a second pilot valve member, to facilitate flow of water from the junction, through the second pilot valve apparatus when the differential valve member is in an open position. The second pilot valve apparatus is responsive to a second pressure to close the second pilot valve member to reduce flow of water therethrough.

An automatic flow control system 10 includes a main flow control valve apparatus 12 that is coupled to inlet and outlet portions 14 and 16 of a water pipe to facilitate flow through the pipe. The system includes a pilot valve assembly 18 that is coupled hydraulically to the main valve through conduits. The system may include a strainer 20 and a conventional T-junction flow stabilizer 22 that receives fluid through a metering orifice 24. The orifice 24 is shown separated from a body of the T-junction for clarity.

The main flow control valve apparatus 12 includes a main valve body 26 having an inlet port 28 communicating with the inlet portion 14, and an outlet port 30 communicating with the outlet portion 16. A main valve seat 32 is disposed between the inlet port 28 and the outlet port 30 and a main valve member is 34 moveable between a fully open position and a closed position engaging the valve seat 32. The main valve member 34 is shown in the closed position in FIG. 1. The main flow control valve apparatus 12 may also include a flexible main valve diaphragm 36 that has a central portion fixed to the main valve member 34 and an outer periphery secured to the valve body 26 to provide a control chamber 38. The main valve body 26 has a control port 40 in fluid communication with the control chamber 38 for the passage of fluid. The main valve member 34 is mounted on a guide stem 42 and has a seal that engages the seat 32. Two complementary portions of the main valve member 34 sandwich the main valve diaphragm 36 therebetween. Optionally, the main flow control valve apparatus 12 may include a main valve piston rather than a main valve diaphragm.

The main valve body 26 includes upper and lower valve guides 44, 46 that guide the valve guide stem 42 for axial movement therethrough to facilitate movement of the main valve member 34 into and out of engagement with the valve seat 32 to control flow through the main flow control valve apparatus 12. A main valve spring 48 is located within the control chamber 38 and extends between the main valve member 34 and the main valve body to apply a closing force on the main valve member 34, in combination with fluid pressure within the control chamber 38.

The above describes a conventional main flow control valve known in the art to control flow through distribution pipes. While construction of the main control valve varies with manufacturer, known valves use control pressure within a control chamber to open and close the main valve.

Inlet and outlet pressure sensor ports 60 and 62 respectively are in fluid communication with the main fluid stream at the inlet and outlet ports 28 and 30 respectively to detect respective pressures therein, which pressures are utilized to generate pressure signals to control actuation of the main flow control valve apparatus 12.

An inlet conduit 64 is in fluid communication with the inlet pressure sensor port 60 at one end thereof, and with the optional strainer 20 at an opposite end thereof. An interconnecting conduit 66 connects the strainer to the metering orifice 24, which may be fixed directly into an inlet port 70 of the T-junction flow stabilizer 22. The T-junction flow stabilizer 22 also has a control port 74 and a pilot port 72. The control port 74 communicates with a spring-loaded ball valve that acts as a flow adjustment mechanism to control flow of fluid with respect to the control port 40.

A control conduit 75 couples to the control port 40 of the main flow control valve apparatus 12 and to the control port 74 of the T-junction flow stabilizer 22 for fluid communication between the control port 40 and the control port 74 of the T-junction flow stabilizer 22. A pilot conduit 76 couples the pilot port 72 of the T-junction flow stabilizer 22 to the pilot valve assembly 18 for fluid communication between the pilot valve assembly 18 and the pilot port 72.

The pilot valve assembly 18 includes a differential pilot valve apparatus 80, a first pressure-reducing pilot valve apparatus 82, and a second pressure-reducing pilot valve apparatus 84.

The differential pilot valve apparatus 80 includes a body 86 that includes an inlet port 88 that is fluidly coupled to the pilot port 72 of the T-Junction flow stabilizer 22 by the pilot conduit 76. The body 86 also includes an outlet port 90 that is fluidly coupled to an inlet port of the first pressure reducing pilot valve apparatus 82. The body 86 includes a seat 93 disposed between the inlet port 88 and the outlet port 90. A valve member 92 is disposed on a valve stem 94 that is moveable away from the seat 93 to an open position in which the inlet port 88 and the outlet port 90 are in fluid commmunication to facilitate the flow of fluid through the body 86. From the open position, the valve member 92 is moveable toward the seat 93 such that the valve member 92 cooperates with the seat 93 to close the valve and inhibit fluid flow through the body 86.

Movement of the valve stem 94 and thus the valve member 92 is controlled by the differential pressure controller 96 in a control part of the body 86. The differential pressure controller 96 includes a diaphragm 98 that extends across the control part of the body 86 and is coupled thereto by sandwiching the periphery of the diaphragm 98 between portions of the body 86. The diaphragm 98 is fixed to the valve stem 94 such that movement of the diaphragm 98 causes movement of the valve stem 94.

The diaphragm 98 separates an interior of the upper part of the body 86 into an upper control chamber 100 and a lower control chamber 102. A port 104 in the lower control chamber 102 is coupled to and in fluid communication with the outlet pressure sensor port 62 on the outlet port side of the main flow control valve apparatus 12 by a fluid conduit 106. A port 108 in the upper control chamber 100 is coupled to and in fluid communication with a port 110 in the outlet portion of pipe 16 by a conduit 111.

A spring 112 applies a force on the diaphragm 98. The force is adjustable by a bolt 114 that includes an end 116 that acts on the spring 112. The bolt 114 is turned to increase or decrease the force applied on the spring 112, thereby adjusting the spacing between the diaphragm 98 and the end 116, to increase or decrease the force on the diaphragm 98. The pressure of fluid in the lower control chamber 102, from the fluid in the outlet port 30 of the main flow control valve apparatus 12, acts upwardly on the diaphragm 98. The pressure of fluid in the upper control chamber 100, from the fluid in the outlet portion of pipe 16, acts downwardly on the diaphragm 98. The differential pilot apparatus 80 is normally closed such that fluid flow from the inlet port 88, through the body 86, to the outlet port 90 is inhibited. With sufficient force acting upwardly, as a result of the differential pressure from the fluid in the outlet port 30 of the main flow control valve apparatus 12 and the fluid from outlet portion of pipe 16, the differential pilot apparatus 80 may be opened.

A flow restricting mechanism 118 such as the flow restricting plate illustrated in FIG. 1 is utilized to create a differential pressure between the outlet port 30 of the main flow control valve apparatus 12 and the outlet portion of pipe 16. Alternatively, the flow restricting mechanism may be a gate, a butterfly valve, or other suitable valve. When the flow is low or very slow, little or no differential pressure may exist. When the flow is greater, the differential pressure is greater.

Each of the first pressure-reducing pilot valve apparatus 82 and the second pressure-reducing pilot valve apparatus 84 includes a body 120 and a casing 122 coupled to the body 120. The body 120 includes a pilot inlet port 124 and a pilot outlet port 126. The pilot inlet port 124 is in fluid communication with the pilot outlet port 126 via a flow-directing conduit 128 within the body 120. The flow-directing conduit 128 includes a valve seat 130 on an end of the flow-directing conduit 128, which end is disposed in the body 120. A flexible diaphragm 132 is clamped between the body 120 and the casing 122. The diaphragm 132 is coupled to a yoke (not shown) that extends over and moves independently of the flow-directing conduit 128. The yoke is fixed to an inner valve member 136 that is sized to cooperate with the valve seat 130 to close the flow-directing conduit 128 when the inner valve member 136 is seated on the valve seat 130 and to open the flow-directing conduit 128 when the inner valve member 136 is spaced from the valve seat 130.

A spring 138 is disposed in the casing 122 and applies a force to the diaphragm 132 via an intermediate guide 140. A screw-threaded bolt 142 may be turned to increase or to decrease the pressure applied by the spring 138 on the diaphragm 132 by reducing the space along the length of the casing 122 in which the spring 138 extends.

The first pressure-reducing pilot valve apparatus 82 is normally open, facilitating flow through the first pilot inlet port 124, along the flow-directing conduit 128, and through the first pilot outlet port 126. Fluid pressure in the body 120 is applied to the diaphragm 132. When the fluid pressure on the diaphragm 132 is sufficient to overcome the biasing force of the spring 138 on the diaphragm 132, the diaphragm 132 flexes toward the casing 122, moving the yoke and thus moving the valve member 136 toward the valve seat 130.

The pressure at which the first pressure reducing pilot valve apparatus 82 is closed is adjustable by adjusting the screw-threaded bolt 142. The first pressure-reducing pilot valve apparatus 82 and the second pressure-reducing pilot valve apparatus 84 are set to two different pressures. For example, the first pressure-reducing pilot valve apparatus 82 may be set to a higher pressure than the second pressure-reducing pilot valve apparatus 84 such that the second pressure-reducing pilot valve apparatus 84 closes at a lower pressure than the first pressure-reducing pilot valve apparatus 82.

The pilot port of the T-junction flow stabilizer 22 is fluidly coupled to the pilot conduit 76. The pilot conduit 76 is split, for example, by a T or Y junction, to couple to the inlet port 88 of the differential pilot valve apparatus 80 and to the pilot inlet port 124 of the second pressure-reducing pilot valve apparatus 84. The outlet port 90 of the differential pilot valve apparatus 80 is fluidly coupled to the pilot inlet port 124 of the first pressure-reducing pilot valve apparatus 82 via a conduit 146. The pilot outlet port 126 of the first pressure-reducing pilot valve apparatus 82 and the pilot outlet port 126 of the second pressure-reducing pilot valve apparatus 84 are both coupled to the outlet portion of pipe 16 via conduits 148, 150, respectively.

In operation, flow control switches from the first pressure-reducing pilot valve apparatus 82 to the second pressure-reducing pilot valve apparatus 84 and from the second pressure-reducing pilot valve apparatus 84 to the first pressure-reducing pilot valve apparatus 82 depending on fluid flow through the main flow control valve apparatus 12, which is dependent on flow demand in the system being supplied downstream.

With increasing flow, the pressure differential across the flow restricting mechanism 118 increases. The fluid pressure from the outlet port 30 acts on the diaphragm 98 of the differential pilot valve apparatus 80. The fluid pressure from the outlet portion of pipe 16 also acts on the diaphragm 98 of the differential pilot valve apparatus 80, in an opposite direction as the fluid pressure from the outlet port 30 acts on the diaphragm. With sufficient flow, the pressure differential across the flow restricting mechanism 118 is great enough such that the fluid pressure from the outlet port 30 is greater than the fluid pressure from the outlet portion of pipe 16, causing the normally closed differential pilot apparatus 80 to open by moving the diaphgram, and compressing the spring 112, thereby moving the valve stem 94 and moving the valve member 92 away from the seat 92. Thus, fluid flows from the inlet port 88, through the differential pilot valve apparatus 80, out the outlet port 90. Fluid flows from the T-junction flow stabilizer 22, through the pilot conduit 76, the differential pilot valve apparatus 80, the conduit 146, and the first pressure-reducing pilot valve apparatus 82. The first pressure-reducing pilot valve apparatus 82 allows a greater flow of fluid than the orifice 24. Thus, fluid flows out of the control chamber 38 of the main flow control valve apparatus 12. The fluid flow out of the control chamber 38 of the main flow control valve apparatus 12 reduces the pressure on the main valve diaphragm 36, causing the main valve member 34 to move, with the diaphragm 36, toward the open position, increasing the flow through the main flow control valve apparatus 12.

When the flow increases, the higher downstream pressure in the outlet portion of pipe 16 increases the pressure on the diaphragm 132 of the second pressure-reducing pilot valve apparatus 84. The second pressure-reducing pilot valve apparatus 84 closes at a lower pressure than the first pressure-reducing pilot valve apparatus 82 and the increase in downstream pressure in the outlet portion of the pipe causes the second pressure-reducing pilot valve apparatus 84 to close, leaving the first pilot valve apparatus 82 to control downstream pressure in the outlet portion of pipe 16.

With decreasing flow through the main flow control valve apparatus 12, during periods of decreasing downstream demand, the pressure differential across the flow restricting mechanism 118 decreases. When the pressure differential across the flow restricting mechanism 118 is insufficient to overcome the bias of the spring 112 and cause the normally closed differential pilot apparatus 80 to remain open, the valve member moves toward the seat 92. Thus, fluid flow from the inlet port 88, through the differential pilot valve apparatus 80, is discontinued and fluid no longer flows to the first pressure-reducing pilot valve apparatus 82. When the differential pilot valve apparatus 80 closes and the second pilot valve apparratus 84 has yet to opened, the fluid flow from the orifice 24 into the T-junction flow stabilizer 22 is greater than the fluid flow through the pilot conduit 76. Thus, fluid flows into the control chamber 38 of the main flow control valve apparatus 12. The fluid flow into the control chamber 38 of the main flow control valve apparatus 12 increases the pressure on the main valve diaphragm 36, causing the main valve member 34 to move, with the diaphragm 36, toward the closed position, decreasing the flow through the main flow control valve apparatus 12. With reduced flow, the pressure in the outlet portion of pipe 16 is reduced and the second pressure reducing pilot valve apparatus 84 opens.

Figure 2:
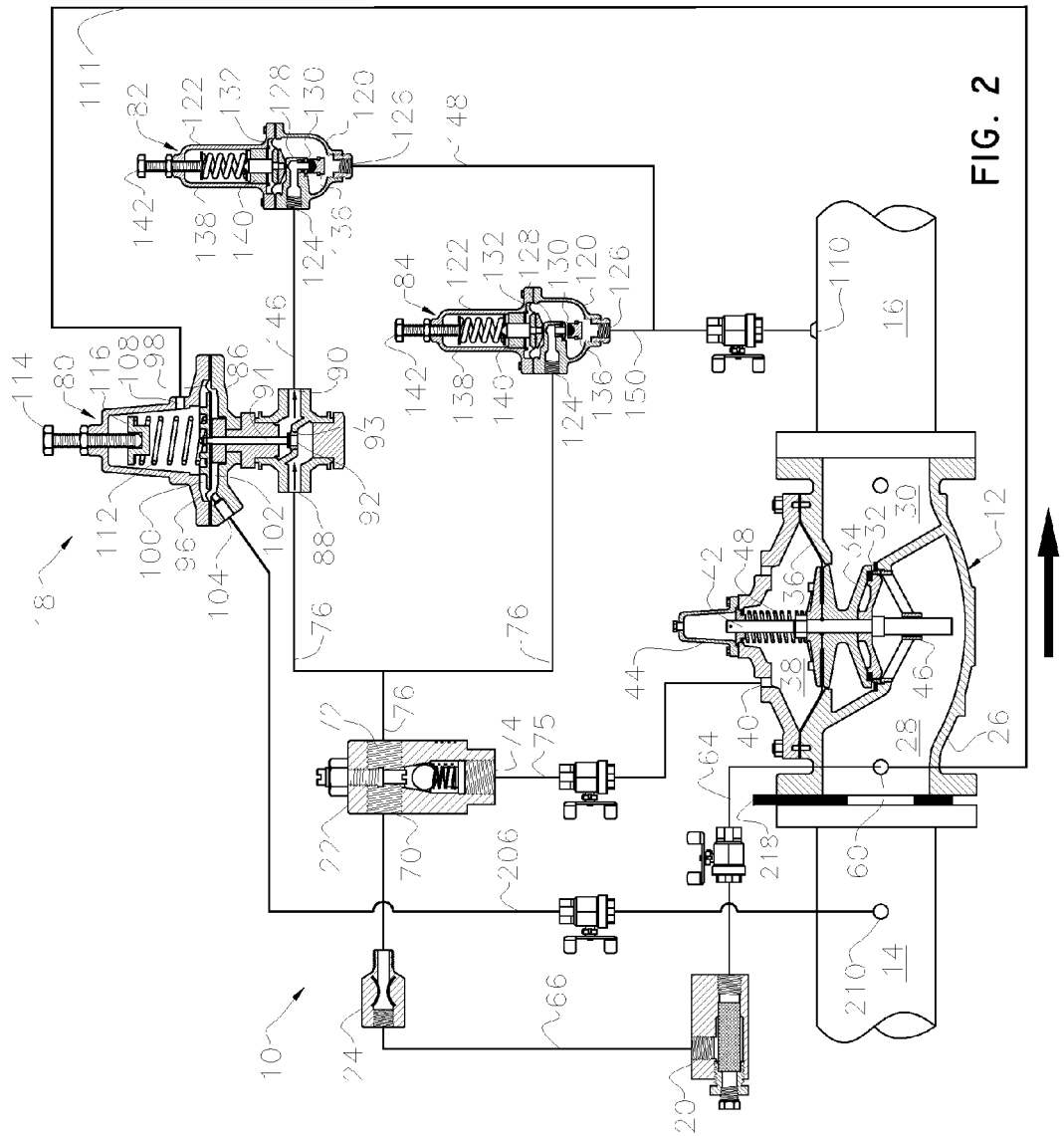
FIG. 2 is a simplified schematic of an automatic flow control system including a differential pilot valve assembly according to another embodiment of the invention.

A second example embodiment of an automatic flow control system including a differential pilot valve assembly is illustrated in FIG. 2. Many of the elements of the example embodiment shown in FIG. 2 are similar to those illustrated in FIG. 1 and described above. For the purpose of clarity and simplicity, those elements are not described again herein.

In this example, the flow restricting mechanism 218 is a flow restricting plate utilized to create a differential pressure between the inlet portion 14 and the inlet port 28 of the main flow control valve apparatus 12. As described above, the flow restricting mechanism may alternatively be a gate, a butterfly valve, or other suitable valve. When the flow is low or very slow, little or no differential pressure may exist. When the flow is greater, the differential pressure is greater.

In this example, the port 104 in the lower control chamber 102 of the differential pilot apparatus 80 is coupled to and in fluid communication with a port 210 in the inlet portion of pipe 14 by a conduit 206. The port 108 in the upper control chamber 100 is coupled to and in fluid communication with the port 60 in the inlet port 28 of the main flow control valve apparatus 12.

The differential pilot apparatus 80 is normally closed such that fluid flow from the inlet port 88, through the body 86, to the outlet port 90 is inhibited. With sufficient force acting upwardly, as a result of the differential pressure from the fluid from the inlet portion of pipe 14 and the fluid from the inlet port 28 of the main flow control valve apparatus 12, the differential pilot apparatus 80 is opened.

In operation, flow control switches from the first pressure-reducing pilot valve apparatus 82 to the second pressure-reducing pilot valve apparatus 84 and from the second pressure-reducing pilot valve apparatus 84 to the first pressure-reducing pilot valve apparatus 82 depending on fluid flow through the main flow control valve apparatus 12, which is dependent on flow demand in the system being supplied downstream.

With increasing flow, the pressure differential across the flow restricting mechanism 218 increases. The fluid pressure from the inlet portion of pipe 14 acts on the diaphragm 98 of the differential pilot valve apparatus 80. The fluid pressure from the inlet port 28 of the main flow control valve apparatus 12 also acts on the diaphragm 98 of the differential pilot valve apparatus 80, in an opposite direction as the fluid pressure from the inlet portion of pipe 14 that acts on the diaphragm 98. With sufficient flow, the pressure differential across the flow restricting mechanism 118 is great enough such that the fluid pressure from the inlet portion of pipe 14 is greater than the fluid pressure from the inlet port 28, causing the normally closed differential pilot apparatus 80 to open by moving the diaphgram, and compressing the spring 112, thereby moving the valve stem 94 and moving the valve member 92 away from the seat 92. Thus, fluid flows from the inlet port 88, through the differential pilot valve apparatus 80, out the outlet port 90. Fluid flows from the T-junction flow stabilizer 22, through the pilot conduit 76, the differential pilot valve apparatus 80, the conduit 146, and the first pressure-reducing pilot valve apparatus 82. The first pressure-reducing pilot valve apparatus 82 allows a greater flow of fluid than the orifice 24. Thus, fluid flows out of the control chamber 38 of the main flow control valve apparatus 12. The fluid flow out of the control chamber 38 of the main flow control valve apparatus 12 reduces the pressure on the main valve diaphragm 36, causing the main valve member 34 to move, with the diaphragm 36, toward the open position, increasing the flow through the main flow control valve apparatus 12.

When the flow increases, the higher downstream pressure in the outlet portion of pipe 16 increases the pressure on the diaphragm 132 of the second pressure-reducing pilot valve apparatus 84. The second pressure-reducing pilot valve apparatus 84 closes at a lower pressure than the first pressure-reducing pilot valve apparatus 82 and the increase in downstream pressure in the outlet portion of the pipe 16 causes the second pressure-reducing pilot valve apparatus 84 to close, leaving the first pilot valve apparatus 82 to control downstream pressure in the outlet portion of pipe 16.

With decreasing flow through the main flow control valve apparatus 12, during periods of decreasing downstream demand, the pressure differential across the flow restricting mechanism 118 decreases. When the pressure differential across the flow restricting mechanism 118 is insufficient to overcome the bias of the spring 112 and cause the normally closed differential pilot apparatus 80 to remain open, the valve member moves toward the seat 92. Thus, fluid flow from the inlet port 88, through the differential pilot valve apparatus 80, is discontinued and fluid no longer flows to the first pressure-reducing pilot valve apparatus 82. When the differential pilot valve apparatus 80 closes and the second pilot valve apparratus 84 has yet to opened, the fluid flow from the orifice 24 into the T-junction flow stabilizer 22 is greater than the fluid flow through the pilot conduit 76. Thus, fluid flows into the control chamber 38 of the main flow control valve apparatus 12. The fluid flow into the control chamber 38 of the main flow control valve apparatus 12 increases the pressure on the main valve diaphragm 36, causing the main valve member 34 to move, with the diaphragm 36, toward the closed position, decreasing the flow through the main flow control valve apparatus 12. With reduced flow, the pressure in the outlet portion of pipe 16 is reduced and the second pressure reducing pilot valve apparatus 84 opens.

Utilizing the differential pressure across the inlet portion of the pipe 14 and the inlet port 28, as in the present embodiment, may be advantageous because the flow of water through the inlet portion of the pipe 14 is closer to laminar, by comparison to flow of water from the outlet port 30, to the outlet portion of the pipe 16. Use of differential pressure across a laminar flow provides more consistent control of the operation of the pilot valve assembly 18.

The automatic flow control system provides two pressure set points utilizing two pressure-reducing pilot valve apparatuses. Although the embodiments both illustrate a single differential pilot valve apparatus 80 and two pressure-reducing pilot valve apparatuses 82, 84, additional differential pilot valve apparatuses and pressure-reducing pilot valve apparatuses may be added to provide additional pressure set points to control the opening and closing of the main flow control valve apparatus 12. Thus, to provide three pressure setting points, rather than two, an additional differential pilot valve apparatus and an additional pressure-reducing pilot valve apparatus may be utilized.

In one of the above-described embodiments, the flow restricting mechanism is disposed between the inlet portion 14 of the pipe and the inlet port 28 of the main flow control valve apparatus 12. In another of the above-describe embodiments, the flow restricting mechanism is disposed between the outlet port 30 of the main flow control valve apparatus and the outlet portion 16 of the pipe. The flow restricting mechanism may be located in any other suitable location to provide a pressure differential for controlling the differential pilot valve apparatus.

Advantageously, the opening and closing of the main flow control valve apparatus is based on downstream demand for water. Multiple different pressure set points may be utilized to control the main flow control valve apparatus, without the use of complex systems requiring power.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

The invention claimed is:

1. An automatic flow control system for use with a main valve apparatus comprising a body having an inlet for coupling to a first end of a water pipe and an outlet for coupling to a second end of a water pipe, a main valve member disposed between the inlet and the outlet and moveable between a closed position in which flow of water through the main valve apparatus is inhibited and an open position to facilitate flow of water through the main valve apparatus, a main valve operator comprising a diaphragm or piston cooperating with the main valve member and the main valve body to provide a control chamber, the main valve operator responsive to control pressure in the control chamber to move the main valve member between the closed position and the open position, and a restriction mechanism disposed on an upstream side of the main valve member for creating a pressure differential between an upstream location of the water pipe and the inlet of the main valve member, the automatic flow control system comprising:

a junction including an inlet port for fluid communication with the inlet of the main valve apparatus by an inlet conduit, a control port for fluid communication with a control chamber of the main valve apparatus by a control conduit, and a pilot port;

a pilot valve assembly comprising:

a differential pilot valve apparatus including a differential valve inlet coupled to the pilot port of the junction, a differential valve outlet, and a differential valve member disposed between the differential valve inlet and the differential valve outlet, the differential pilot valve apparatus responsive to the pressure differential between the upstream location of the water pipe and the inlet of the main valve member to move the differential valve member between an open position in which water flows from the differential valve inlet to the differential valve outlet and a closed position in which water flow from the differential valve inlet to the differential valve outlet is inhibited;

a first pilot valve apparatus including a first pilot valve inlet coupled to the differential valve outlet, a first pilot valve outlet, and a first pilot valve member disposed between the first pilot valve inlet and the first pilot valve outlet, the first pilot valve outlet coupled to the second end of the water pipe to facilitate flow of water from the differential valve outlet, through the first pilot valve apparatus, to the second end of the water pipe when the differential valve member is in an open position, the first pilot valve apparatus being responsive to a first pressure to close the first pilot valve member to reduce flow of water through the first pilot valve apparatus;

a second pilot valve apparatus including a second pilot valve inlet coupled to the junction, a second pilot valve outlet, and a second pilot valve member, the second pilot valve outlet coupled to the second end of the water pipe to facilitate flow of water from the junction, through the second pilot valve apparatus, to the second end of the water pipe when the differential valve member is in an open position, the second pilot valve apparatus being responsive to a second pressure to close the second pilot valve member to reduce flow of water through the second pilot valve apparatus, wherein the first pressure differs from the second pressure.

2. The system according to claim 1, wherein the differential pilot valve apparatus comprises a body including the differential valve inlet and the differential valve outlet, a differential diaphragm dividing an interior of the body into a first pilot chamber and second pilot chamber, the differential valve member being coupled to the differential diaphragm and moveable therewith in response to a change in the difference in pressure between the first pilot chamber and the second pilot chamber.

3. The system according to claim 1, wherein the first pressure is higher than the second pressure.

4. The system according to claim 1, wherein the differential valve member is normally closed to inhibit fluid flow through the differential pilot valve apparatus.

5. The system according to claim 1, wherein, in response to an increase in the pressure differential, the differential valve member is configured to move from a closed position to an open position to direct fluid through the differential pilot valve apparatus, to the first pilot valve apparatus.

6. The system according to claim 1, wherein, in response to a decrease in the pressure differential, the differential valve member is configured to move from an open position to a closed position.

7. The system according to claim 1, wherein, in response to an increase in pressure in the second end of the water pipe, the second pressure-reducing pilot valve apparatus is configured to close.

8. The system according to claim 1, wherein the second pressure-reducing pilot valve apparatus is configured to close at a lower pressure than the first pressure-reducing pilot valve apparatus.

9. An automatic flow control system comprising:
a main valve apparatus comprising a body having an inlet for coupling to a first end of a water pipe and an outlet for coupling to a second end of a water pipe, a main valve member disposed between the inlet and the outlet and moveable between a closed position in which flow of water through the main valve apparatus is inhibited and an open position to facilitate flow of water through the main valve apparatus, a main valve operator comprising a diaphragm or piston cooperating with the main valve member and the main valve body to provide a control chamber, the main valve operator responsive to control pressure in the control chamber to move the main valve member between the closed position and the open position;
a restriction mechanism disposed on an upstream side of the main valve member for creating a differential pressure between an upstream location of the water pipe and the inlet of the main valve member, the automatic flow control system comprising:
a junction including an inlet port for fluid communication with the inlet of the main valve apparatus by an inlet conduit, a control port for fluid communication with a control chamber of the main valve apparatus by a control conduit, and a pilot port;
a pilot valve assembly comprising:
a differential pilot valve apparatus including a differential valve inlet coupled to the pilot port of the junction, a differential valve outlet, and a differential valve member disposed between the differential valve inlet and the differential valve outlet, the differential pilot valve apparatus responsive to the pressure differential between the upstream location of the water pipe and the inlet of the main valve member to move the differential valve member between an open position in which water flows from the differential valve inlet to the differential valve outlet and a closed position in which water flow from the differential valve inlet to the differential valve outlet is inhibited;
a first pilot valve apparatus including a first pilot valve inlet coupled to the differential valve outlet, a first pilot valve outlet, and a first pilot valve member disposed between the first pilot valve inlet and the first pilot valve outlet, the first pilot valve outlet coupled to the second end of the water pipe to facilitate flow of water from the differential valve outlet, through the first pilot valve apparatus, to the second end of the water pipe when the differential valve member is in an open position, the first pilot valve apparatus being responsive to a first pressure to close the first pilot valve member to reduce flow of water through the first pilot valve apparatus;
a second pilot valve apparatus including a second pilot valve inlet coupled to the junction, a second pilot valve outlet, and a second pilot valve member, the second pilot valve outlet coupled to the second end of the water pipe to facilitate flow of water from the junction, through the second pilot valve apparatus, to the second end of the water pipe when the second differential valve member is in an open position, the second pilot valve apparatus being responsive to a second pressure to close the second pilot valve member to reduce flow of water through the second pilot valve apparatus,
wherein the first pressure differs from the second pressure.

10. The system according to claim 9, wherein the differential pilot valve apparatus comprises a body including the differential valve inlet and the differential valve outlet, a differential diaphragm dividing an interior of the body into a first pilot chamber and second pilot chamber, the differential valve member being coupled to the differential diaphragm and moveable therewith in response to a change in the difference in pressure between the first pilot chamber and the second pilot chamber.

11. The system according to claim 9, wherein the first pressure is higher than the second pressure.

12. The system according to claim 9, wherein the differential valve member is normally closed to inhibit fluid flow through the differential pilot valve apparatus.

13. The system according to claim 9, wherein, in response to an increase in pressure differential, the differential valve member is configured to move from a closed position to an open position to direct fluid through the differential pilot valve apparatus, to the first pilot valve apparatus.

14. The system according to claim 9, wherein, in response to a decrease in the pressure differential, the differential valve member is configured to move from an open position to a closed position.

15. The system according to claim 9, wherein, in response to an increase in the pressure in the second end of the water pipe, the second pressure-reducing pilot valve apparatus is configured to close.

16. The system according to claim 9, wherein the second pressure-reducing pilot valve apparatus is configured to close at a lower pressure than the first pressure-reducing pilot valve apparatus.

* * * * *